United States Patent
Lee et al.

(10) Patent No.: US 10,033,044 B2
(45) Date of Patent: Jul. 24, 2018

(54) CONDUCTING MATERIAL COMPOSITION, AND SLURRY COMPOSITION FOR FORMING ELECTRODE OF LITHIUM RECHARGEABLE BATTERY AND LITHIUM RECHARGEABLE BATTERY USING THE SAME

(71) Applicant: LG Chem, Ltd., Seoul (KR)

(72) Inventors: Kil Sun Lee, Daejeon (KR); Kwon Nam Sohn, Daejeon (KR); Won Jong Kwon, Daejeon (KR); Seung Bo Yang, Daejeon (KR); In Young Kim, Daejeon (KR); Kwang Hyun Yoo, Daejeon (KR); Mi Jin Lee, Daejeon (KR); Jin Yeong Lee, Daejeon (KR)

(73) Assignee: LG Chem, Ltd. (KR)

( * ) Notice: Subject to any disclaimer, the term of this patent is extended or adjusted under 35 U.S.C. 154(b) by 43 days.

(21) Appl. No.: 15/038,857

(22) PCT Filed: Dec. 22, 2014

(86) PCT No.: PCT/KR2014/012641
§ 371 (c)(1),
(2) Date: May 24, 2016

(87) PCT Pub. No.: WO2015/099379
PCT Pub. Date: Jul. 2, 2015

(65) Prior Publication Data
US 2016/0380270 A1 Dec. 29, 2016

(30) Foreign Application Priority Data

Dec. 27, 2013 (KR) .................... 10-2013-0165068
Dec. 19, 2014 (KR) .................... 10-2014-0184901

(51) Int. Cl.
*H01M 4/62* (2006.01)
*H01B 1/24* (2006.01)
(Continued)

(52) U.S. Cl.
CPC .............. *H01M 4/625* (2013.01); *H01B 1/24* (2013.01); *H01M 4/0404* (2013.01);
(Continued)

(58) Field of Classification Search
None
See application file for complete search history.

(56) References Cited

U.S. PATENT DOCUMENTS 4,746,325 A 5/1988 Nakamura et al.
2004/0217520 A1 11/2004 Hong et al.
(Continued)

FOREIGN PATENT DOCUMENTS

CN 101663714 A 3/2010
CN 101752548 * 6/2010 .............. H01M 4/62
(Continued)

OTHER PUBLICATIONS

English translation of CN 101752548 (2010).*
(Continued)

*Primary Examiner* — Yoshitoshi Takeuchi
(74) *Attorney, Agent, or Firm* — Lerner, David, Littenberg, Krumholz & Mentlik, LLP

(57) ABSTRACT

The present invention relates to a conducting material composition capable of forming an electrode in which at least two kinds of carbon based materials are contained in a uniformly dispersed state to enable a battery such as a lithium rechargeable battery having more improved electrical and lifetime characteristics to be provided, and a slurry composition for forming an electrode of a lithium rechargeable battery and a lithium rechargeable battery using the (Continued)

same. The conducting material composition contains: at least two kinds of conductive carbon-based materials selected from the group consisting of carbon nano tube, graphene, and carbon black; and a dispersant containing a plurality kinds of poly aromatic hydrocarbon oxides, wherein the dispersant contains poly aromatic hydrocarbon oxides having a molecular weight of 300 to 1000 at a content of 60 wt.% or more.

14 Claims, 9 Drawing Sheets

(51) Int. Cl.
H01M 4/04 (2006.01)
H01M 4/139 (2010.01)
H01M 10/0525 (2010.01)
H01M 10/052 (2010.01)

(52) U.S. Cl.
CPC ....... *H01M 4/139* (2013.01); *H01M 10/0525* (2013.01); *H01M 10/052* (2013.01)

(56) References Cited

U.S. PATENT DOCUMENTS

| | | | |
|---|---|---|---|
| 2005/0240051 A1 | 10/2005 | Yasuda et al. | |
| 2007/0122712 A1 | 5/2007 | Kang et al. | |
| 2010/0187485 A1 | 7/2010 | Kitano | |
| 2010/0248034 A1 | 9/2010 | Oki et al. | |
| 2011/0300443 A1* | 12/2011 | He | H01B 1/24 429/215 |
| 2012/0244334 A1* | 9/2012 | Park | H01M 4/131 428/221 |
| 2012/0321953 A1 | 12/2012 | Chen et al. | |
| 2013/0187084 A1 | 7/2013 | Yoon et al. | |
| 2015/0024277 A1 | 1/2015 | Komatsu et al. | |

FOREIGN PATENT DOCUMENTS

| | | |
|---|---|---|
| CN | 101752548 A | 6/2010 |
| CN | 102911446 A | 2/2013 |
| DE | 102011003016 A1 | 7/2012 |
| JP | 2009176721 A | 8/2009 |
| JP | 2009298625 A | 12/2009 |
| JP | 2013136480 A | 7/2013 |
| JP | 2013175322 A | 9/2013 |
| JP | 6106339 B2 | 3/2017 |
| KR | 20030013553 A | 2/2003 |
| KR | 20040076466 A | 9/2004 |
| KR | 100728160 B1 | 6/2007 |
| KR | 100773551 B1 | 11/2007 |
| KR | 20080064571 A | 7/2008 |
| KR | 20090054677 A | 6/2009 |
| KR | 20100095473 A | 8/2010 |
| KR | 20110029321 A | 3/2011 |
| KR | 20110072917 A | 6/2011 |
| KR | 20110101347 A | 9/2011 |
| KR | 20120053399 A | 5/2012 |
| KR | 20130060859 A | 6/2013 |
| KR | 20130094365 A | 8/2013 |
| TW | 201338253 A | 9/2013 |
| WO | 2004039483 A1 | 5/2004 |
| WO | 2008136347 A1 | 11/2008 |

OTHER PUBLICATIONS

Wikipedia Triton X-100 (2017).*
International Search Report from PCT/KR2014/012641, dated Apr. 9, 2015.
Shin-Yi Yang, et al., "Design and tailoring of a hierarchical graphene-carbon nanotube architecture for supercapacitors." Journal of Materials Chemistry, 2011, vol. 21, p. 2374-2380.
Xiaochen Dong, et al., "One-step growth of graphene-carbon nanotube hybrid materials by chemical vapor deposition." Science Direct; Carbon vol. 49 (2011) pp. 2944-2949.
Vincent C. Tung, et al., "Low-Temperature Solution Processing of Graphene-Carbon Nanotube Hybrid Materials for High-Performance Transparent Conductors." Nano Letters, 2009, vol. 9, No. 5, pp. 1949-1955.
Extended European Search Report for application No. 14873341.3 dated Feb. 7, 2017.
Isao M0chida et al: "Chemistry of synthesis , structure, preparation and application of aromatic-derived mesophase pitch", CARBON., vol. 38, No. 2, Jan. 1, 2000 (Jan. 1, 2000), pp. 305-328, XP055338134.
Petrova B et al: "Effect of different oxidation treatments on the Chemical structure and properties o f commercial coal tar pitch" , Carbon, Elsevier, Oxford, GB, vol. 43, No. 2, Jan. 1, 2005 (Jan. 1, 2005), pp. 261-267, XP004646558.

* cited by examiner

[FIG. 1a]
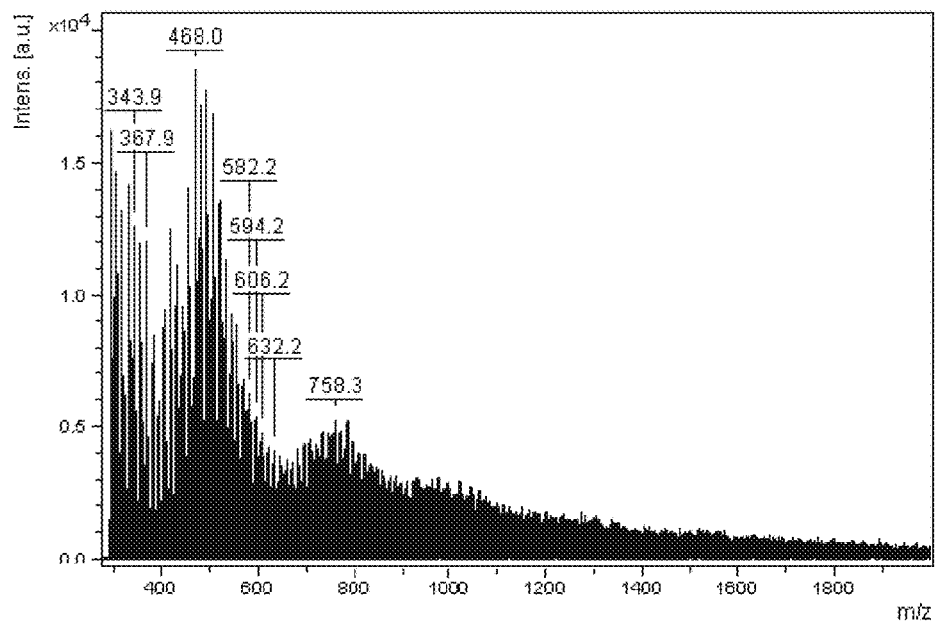
[FIG. 1b]
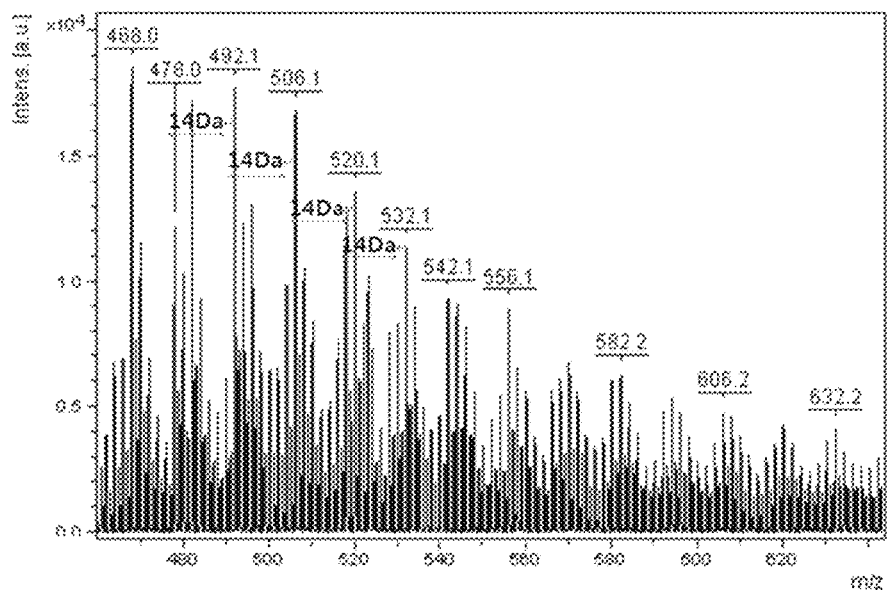

[FIG. 2a]
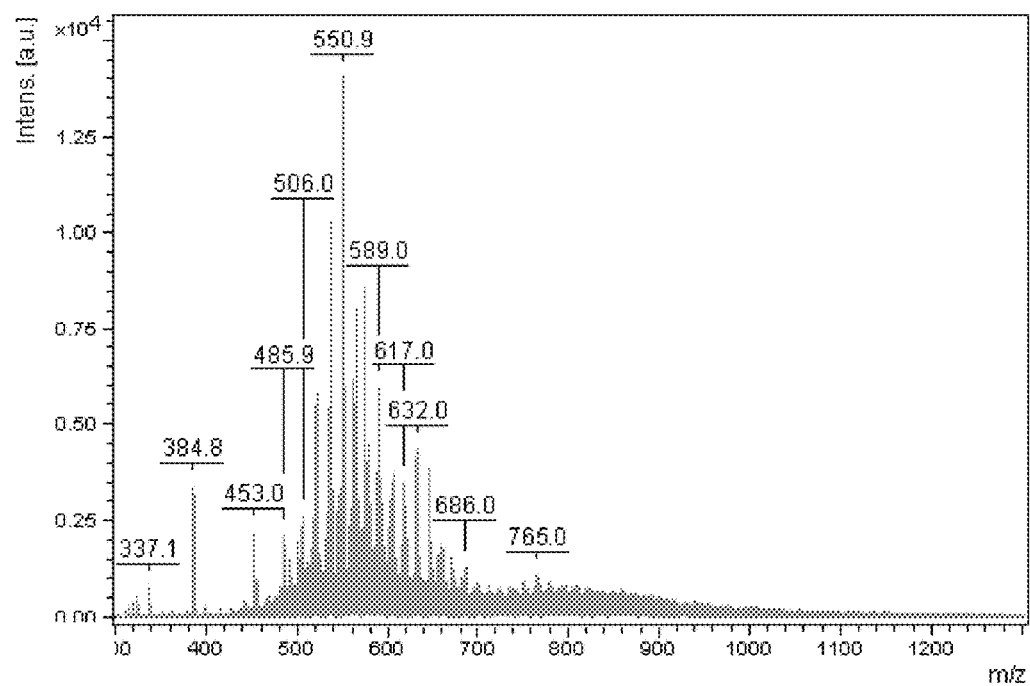

[FIG. 2b]
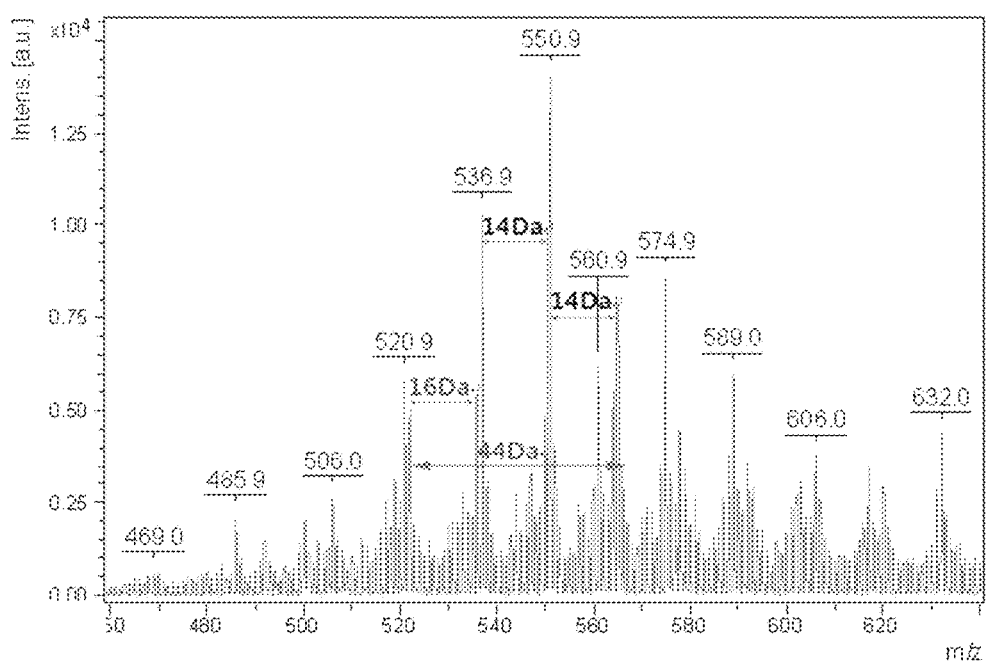

[FIG. 3]
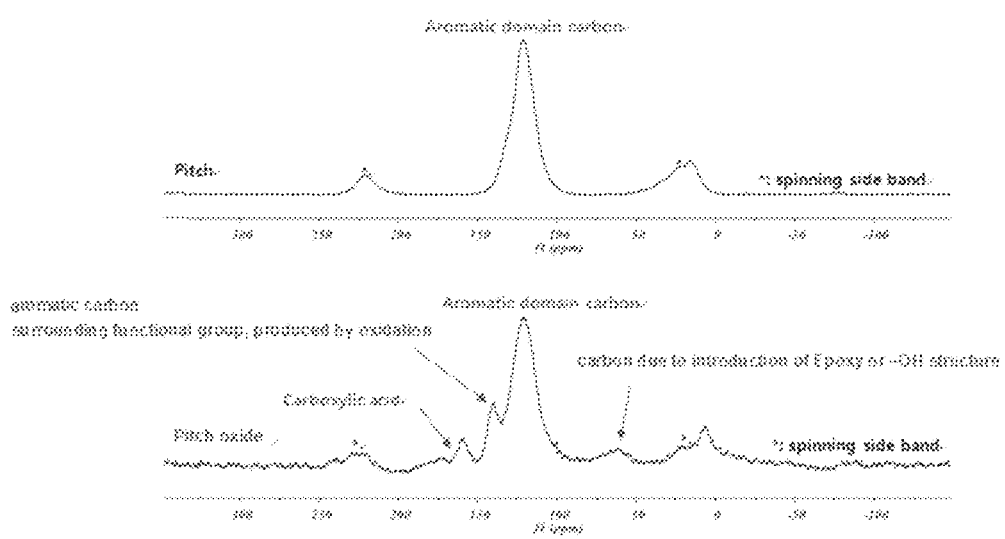

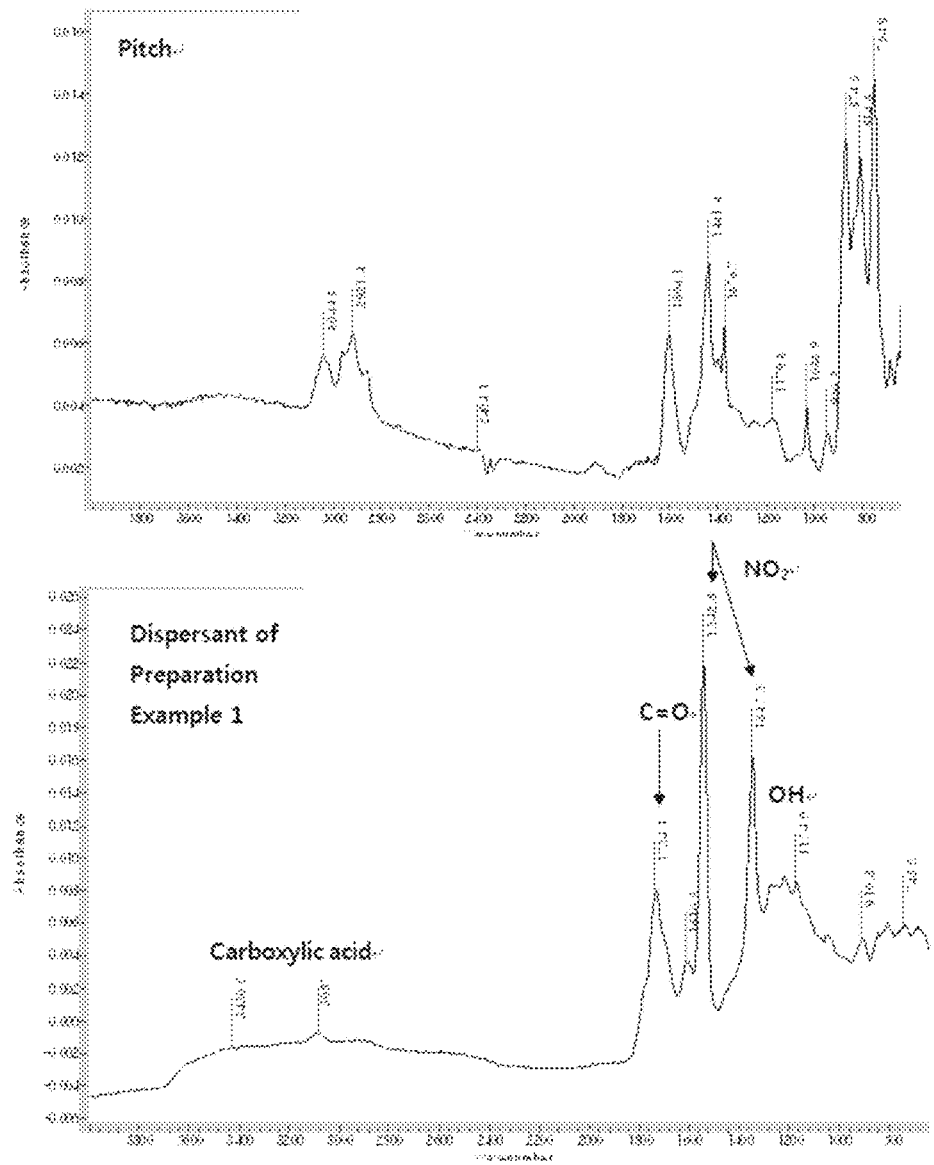
[FIG. 4]

[FIG. 5]
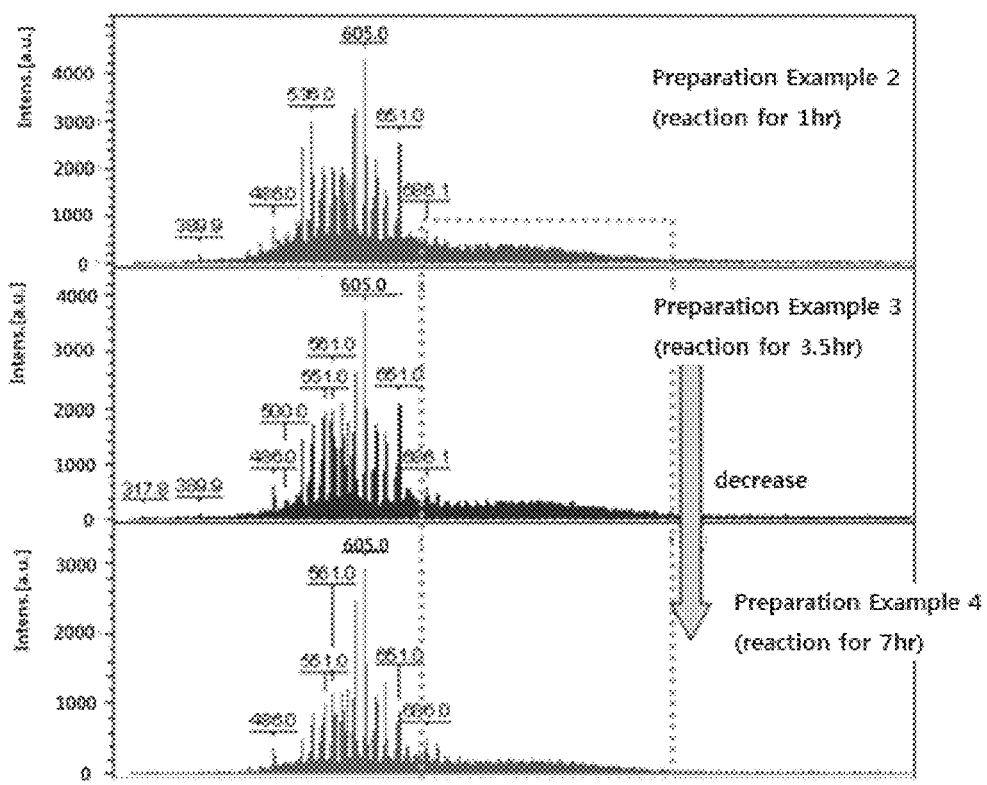

[FIG. 6a]
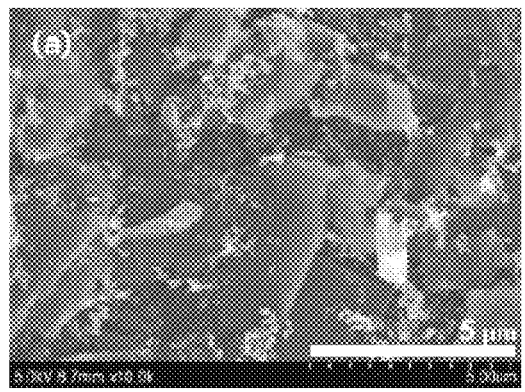
[FIG. 6b]
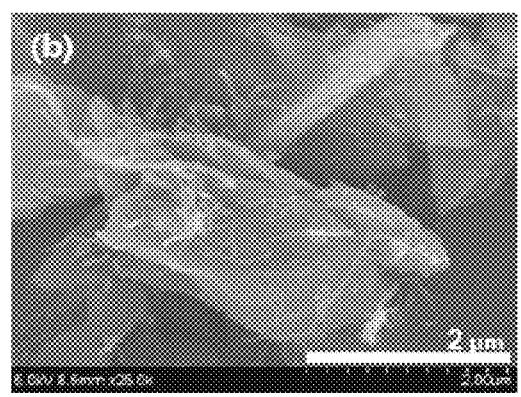
[FIG. 6c]
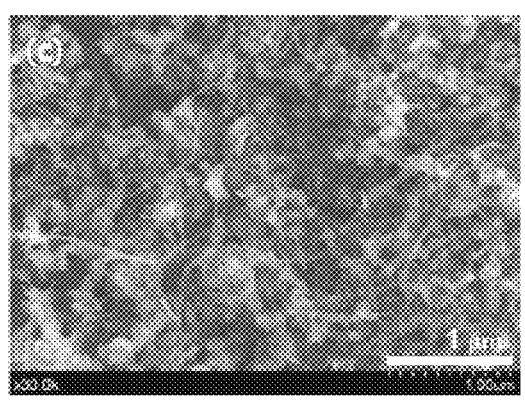

[FIG. 6d]
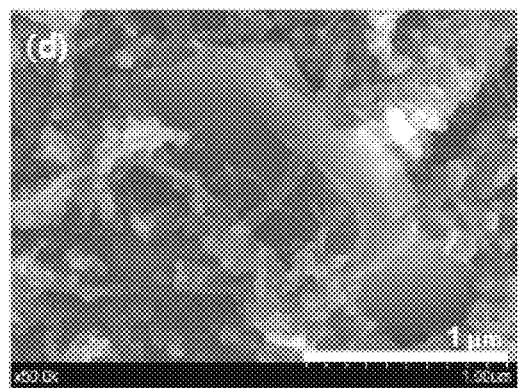
[FIG. 7a]
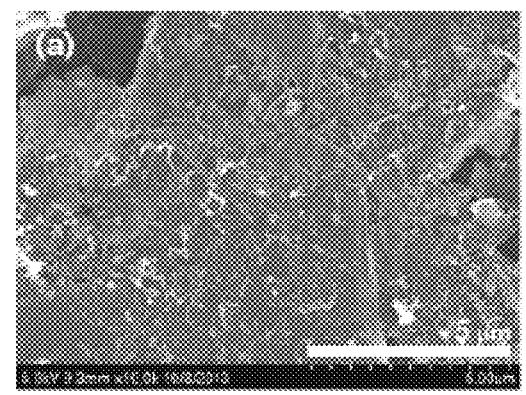
[FIG. 7b]
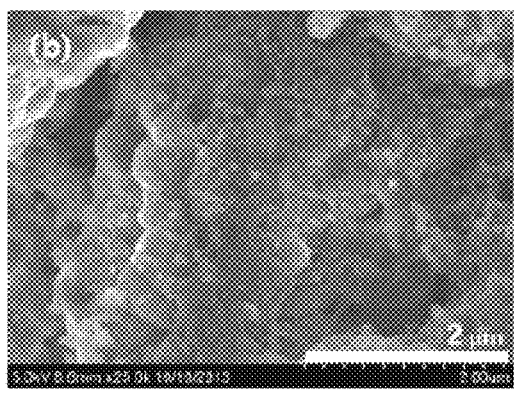

[FIG. 8]
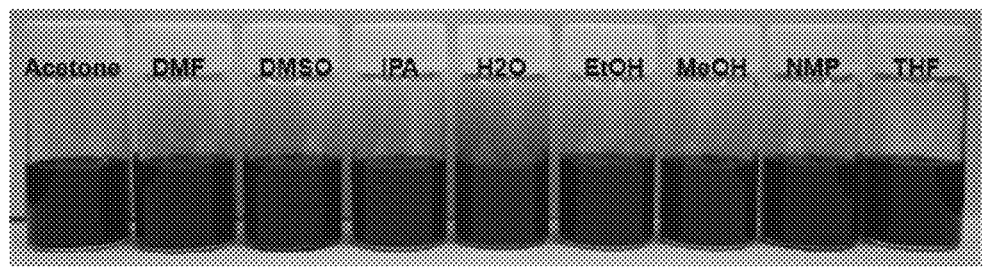
[FIG. 9]
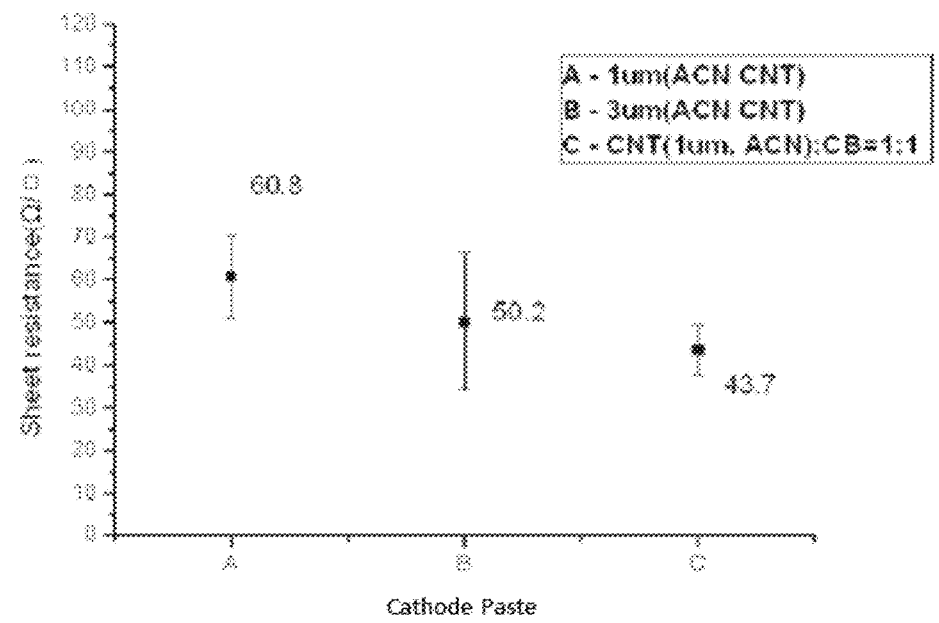

CONDUCTING MATERIAL COMPOSITION, AND SLURRY COMPOSITION FOR FORMING ELECTRODE OF LITHIUM RECHARGEABLE BATTERY AND LITHIUM RECHARGEABLE BATTERY USING THE SAME

CROSS-REFERENCE TO RELATED APPLICATION

This application is a national phase entry under 35 U.S.C. § 371 of International Application No. PCT/KR2014/012641, filed Dec. 22, 2014, which claims priority to Korean Patent Application No. 10-2013-0165068, filed Dec. 27, 2013 and Korean Patent Application No. 10-2014-0184901, filed Dec. 19, 2014, the disclosures of which are incorporated herein by reference.

TECHNICAL FIELD

The present invention relates to a conducting material composition capable of forming an electrode in which at least two kinds of carbon-based materials are contained in a uniformly dispersed state to enable a battery such as a lithium rechargeable battery, or the like, having more improved electrical and lifetime characteristics to be manufactured, a slurry composition for forming an electrode of a lithium rechargeable battery and a lithium rechargeable battery using the same.

BACKGROUND

Recently, in accordance with rapid growth of electric vehicle market, power storage battery market, mobile smart device market, or the like, the development of a battery such as a lithium rechargeable battery having capacity and output characteristics higher than previously known values, or the like, has been demanded.

In order to develop high capacity battery as described above, generally, an electrode should be thickened, and electrodes should be smoothly transported from the thickened electrode to a current collector. However, carbon black, which is used as a conducting material in an existing rechargeable battery and has a zero-dimensional structure, does not form an effective conducting path, such that carbon black may not satisfy the technical requirements as described above.

Therefore, recently, an attempt to use at least two kinds of conductive carbon-based materials together as the conducting material to further improve characteristics of the conducting material and the electrode has been conducted.

For example, in the case of using at least two kinds of conductive carbon-based materials such as graphene, carbon nano tube, carbon black, or the like, together, each of the conductive carbon-based materials having different structural features may form a point contact, a line contact, and/or a surface contact, thereby making it possible to form a three dimensional network structure. As a representative example, in the case of using graphene and carbon nano tube or carbon black together, the carbon nano tube or carbon black is adsorbed in a surface of the graphene, and a contact is generated between the carbon nano tubes or carbon blacks, such that a three dimensional network structure may be formed. As another example, in the case of using carbon nano tube and carbon black together, the carbon black is adsorbed in a surface of the carbon nano tube, and a contact is generated between the carbon blacks or carbon nano tubes, such that a three dimensional network structure may be formed.

In the case of forming the three dimensional network structure as described above, $\pi$-$\pi$ interactions between the graphenes or carbon nano tubes may be decreased due to steric hindrance. As a result, it is possible to suppress electrical characteristics from being rather decreased by re-aggregation of each of the conductive carbon-based materials in the conductive material.

Due to this advantage, research into a method of preparing a conducting material containing at least two kinds of conductive carbon-based materials in a uniformly dispersed state has been conducted, and several methods as described below have been suggested.

First, as a method of obtaining a powdery composition containing graphene and carbon nano tube together in a uniformly dispersed state, a method of obtaining graphene powder using a Hummers method, acid-treating the graphene powder in an aqueous solvent, mixing the acid-treated graphene powder with carbon nano tube, thermally reducing the mixed powder, dispersing the reduced powder using ultrasonic waves, and recovering a powdery composition using centrifugation, or the like, has been known (J. Mater. Chem., 2011, 21, 2374-2380).

This method has an advantage in that the powdery composition of graphene and carbon nano tube may be obtained in an aqueous solvent, but the entire process was complicated, extremely severe process conditions such as an acid treatment process using a strong acid, or the like, were required, a restacking problem after recovering the powdery composition, or the like, was generated, such that there was a limitation in obtaining the powdery composition in a state in which both components were uniformly dispersed. Therefore, even in the case of obtaining the powdery composition as described above and using the obtained powdery composition as a conducting material of a battery, an effect capable of being obtained by using at least two kinds of conductive carbon-based materials together may not be sufficiently implemented.

As another method known in the art, for example, a method of growing graphene and carbon nano tube through a deposition process such as chemical vapor deposition (CVD) process, or the like, after spin coating a catalyst component on metal foil made of copper, or the like, has been known (Carbon, 2011, 49, 2844-2949).

This method has an advantage in that it is possible to obtain a solid composition of graphene and carbon nano tube while adjusting the solid composition so as to have the desired shape and physical properties. However, since this method is only an experimental method it is difficult to apply this method to a mass production process in industries. Therefore, even in the case of using this method, it is difficult to easily obtain a powdery composition or conducting material in a state in which at least two kinds of conductive carbon-based materials are uniformly dispersed.

Due to problems in the related art, a powdery conducting material composition containing at least two kinds of carbon-based materials in a uniformly dispersed state and a method of preparing the same have been continuously demanded.

SUMMARY OF THE INVENTION

The present invention provides a conducting material composition capable of being prepared using a powdery composition in which at least two kinds of carbon-based materials are a uniformly dispersed to thereby form an electrode in which these carbon-based materials are contained in a uniformly dispersed state and enable a battery such as a lithium rechargeable battery having more improved electrical and lifetime characteristics, or the like, to be provided, and a preparation method thereof.

In addition, the present invention provides a slurry composition for forming an electrode of a lithium rechargeable battery using the conducting material.

Further, the present invention provides a lithium rechargeable battery including an electrode formed of the slurry composition for forming an electrode to have more improved characteristics.

An exemplary embodiment of the present invention provides a conducting material composition containing: at least two kinds of conductive carbon-based materials selected from the group consisting of carbon nano tube, graphene, and carbon black; and a dispersant containing a plurality kinds of poly aromatic hydrocarbon oxides, wherein the dispersant contains poly aromatic hydrocarbon oxides having a molecular weight of about 300 to 1000 at a content of about 60 wt % or more.

In this conducting material composition, the dispersant may be adsorbed in a surface of the conductive carbon-based material, and the conducting material composition may be a powdery composition in which the at least two kinds of conductive carbon-based materials are uniformly dispersed.

Further in the conducting material composition, the conductive carbon-based material may contain 10 to 90 wt % of carbon black and 10 to 90 wt % of at least one kind selected from graphene and carbon nano tube.

In addition, in the conducting material composition, at the time of performing element analysis on the plurality kinds of poly aromatic hydrocarbon oxides contained in the dispersant, an oxygen content may be about 12 to 50 wt. % of the entire element content of the dispersant. Further, in this dispersant, the poly aromatic hydrocarbon oxides may have a structure in which at least one oxygen-containing functional group is boded to aromatic hydrocarbon including 5 to 30 benzene rings or 7 to 20 benzene rings. Further, the oxygen-containing functional group may be at least one kind selected from the group consisting of a hydroxyl group, an epoxy group, a carboxyl group, a nitro group, and sulfonic acid.

In addition, the conducting material composition as described above may contain 1 to 50 parts by weight of the dispersant based on 100 parts by weight of the conductive carbon-based material.

The conducting material composition as described above may be used to form an electrode of a battery. In more specific example, the conducting material composition may be contained in a slurry composition for forming an electrode of a lithium rechargeable battery.

Another embodiment of the present invention provides a preparation method of the conducting material composition as described above, including: forming a dispersion solution in which the conductive carbon-based materials and the dispersant are dispersed in a polar solvent; and dispersing the conductive carbon-based materials by performing sonication on the dispersion solution or applying physical force to the dispersion solution.

The preparation method of the conducting material composition as described above, may further include, after the dispersing of the conductive carbon-based materials, recovering and drying a conducting material composition from the dispersion solution in a powder state.

Another embodiment of the present invention provides a slurry composition for forming an electrode of a lithium rechargeable batter, including an electrode active material, the conducting material composition as described above, a binder, and a solvent.

In this slurry composition, the electrode active material may include a cathode active material or an anode active material, and the binder may include at least one kind selected from the group consisting of a vinylidenefluoride/hexafluoropropylene copolymer, polyvinylidenefluoride, polyacrylonitrile, polymethylmethacrylate, polyacrylate, polytetrafluoroethylene, a poly(styrene-butadiene) copolymer, alginate, and polydoamine.

In addition, the solvent may include at least one kind selected from the group consisting of water, N-methylpyrrolidone, acetone, tetrahydrofuran, and decane.

Further, the slurry composition may contain: based on 100 parts by weight of a total solid content obtained by adding solid contents of the electrode active material, the conducting material composition, and the binder, 70 to 98 parts by weight of the electrode active material; 0.1 to 15 parts by weight of the conducting material composition; and 1.0 to 20 parts by weight of the binder.

Another exemplary embodiment of the present invention provides a lithium rechargeable battery including: an anode including a current collector and an anode active material layer containing an anode active material, a conducting material, and a binder and formed on the current collector; a cathode including a current collector and a cathode active material layer containing a cathode active material, a conducting material, and a binder and formed on the current collector; and an electrolyte, wherein at least one of the conducting materials contained in the anode active material layer and the cathode active material layer contains the conducting material composition.

Advantageous Effects

According to the present invention, a powdery conducting material in which at least two kinds of conductive carbon-based materials are contained in a uniformly dispersed state may be more easily prepared and provided by using a specific dispersant. Particularly, this powdery conducting material composition may be prepared and provided by a significantly simplified method as compared to a method previously known in the art, and the powdery conducting material composition may have significantly excellent redispersibility for various polar solvents due to an action of the dispersant.

Therefore, the conducting material composition according to the present invention may maximally exhibit an effect obtained by containing at least two kinds of conductive carbon-based materials together and significantly contribute to providing a battery such as a lithium rechargeable battery having more improved electrical and lifetime characteristics, or the like.

BRIEF DESCRIPTION OF THE DRAWINGS

FIGS. 1A and 1B are views (enlarged views at a molecular weight regions of 400 to 500) obtained by analyzing molecular weight distribution of pitches using matrix-assisted laser desorption/ionization-time-of-flight (MALDI-TOF) mass spectrum.

FIGS. 2A and 2B are views (enlarged views at a molecular weight region of 400 to 500) obtained by analyzing molecular weight distribution of a dispersant obtained in Preparation Example 1 using MALDI-TOF mass spectrum.

FIG. 3 is a view illustrating results obtained by analyzing pitches and the dispersant in Preparation Example 1, respectively, using 13 C cross-polarized magic-angle-spinning (CPMAS) nuclear magnetic resonance (NMR).

FIG. 4 is a view illustrating results obtained by analyzing pitches and the dispersant in Preparation Example 1, respectively, using a Fourier transform-infrared spectroscopy (FT-IR).

FIG. 5 is a view illustrating results obtained by analyzing molecular weight distribution of dispersants obtained in Preparation Examples 2 to 4 using MALDI-TOF mass spectrum, respectively, and comparing the analyzed results.

FIGS. 6A to 6D are electron microscope photographs of powdery conducting material compositions obtained in Examples 1 to 4.

FIGS. 7A and 7B are electron microscope photographs after obtaining a slurry composition for forming a cathode and a slurry composition for forming an anode using the powdery conducting material composition in Examples 5 and 6, respectively, and applying and drying the slurry compositions onto a copper current collector (tape).

FIG. 8 is a photograph illustrating results of redispersing the conducting material composition of Example 3 in various polar solvents in Experimental Example 3, observed by the naked eyes.

FIG. 9 is a graph illustrating results of measuring sheet resistance of slurry obtained in Experimental Example 3.

DETAILED DESCRIPTION OF THE EMBODIMENTS

Hereinafter, a conducting material composition according to an exemplary embodiment of the present invention, a slurry composition for forming an electrode and a lithium rechargeable battery using the same will be described in detail.

First, as used herein, the term "dispersant" may indicate an arbitrary component for uniformly dispersing a carbon-based material such as a different component, for example, graphene, carbon black, carbon nano tube, or the like, in an aqueous solvent, an organic solvent, or other liquid mediums.

In addition, the term "conducting material composition" may indicate an arbitrary composition capable of being used as a conducting material in a composition for forming an electrode of a battery such as a lithium rechargeable battery, or the like. Here, all of the compositions capable of being added to an arbitrary composition for forming an electrode as a conducting material are included in a category of the "conducting material composition" regardless of a state or a specific use of the "conducting material composition" or the composition for forming an electrode.

In addition, as used herein, the term "poly aromatic hydrocarbon" may indicate an aromatic hydrocarbon compound in which aromatic rings, for example, two or more, or five or more benzene rings are bonded to and included in a single compound structure. Further, the term "poly aromatic hydrocarbon oxide" may indicated an arbitrary compound in which at least one oxygen-containing functional group is bonded in a chemical structure by a reaction of the above-mentioned "poly aromatic hydrocarbon" and an oxidant. In this case, the oxygen-containing functional group capable of being introduced into the "poly aromatic hydrocarbon" may be an arbitrary functional group capable of being bonded to the aromatic ring and containing at least one oxygen atoms in the functional group, for example, a hydroxyl group, an epoxy group, a carboxyl group, a nitro group, sulfonic acid, or the like.

Meanwhile, according to an exemplary embodiment of the present invention, there is provided a conducting material composition containing: at least two kinds of conductive carbon-based materials selected from the group consisting of carbon nano tube, graphene, and carbon black; and a dispersant containing a plurality kinds of poly aromatic hydrocarbon oxides, wherein the dispersant contains poly aromatic hydrocarbon oxides having a molecular weight of about 300 to 1000 at a content of about 60 wt. % or more.

The conducting material composition according to the exemplary embodiment of the present invention contains at least two kinds of conductive carbon-based materials selected from carbon nano tube, graphene, and carbon black, and simultaneously contains the dispersant containing a mixture of a predetermined poly aromatic hydrocarbon oxide. As experimental results obtained by the present inventors, it was confirmed that at least two kinds of conductive carbon-based materials may be significantly uniformly dispersed by an action of the specific dispersant as described above.

Therefore, due to the action of the dispersant as described above, the conducting material composition according to the exemplary embodiment of the present invention may be prepared and provided by a simplified method of mixing the at least two kinds of conductive carbon-based materials in a solvent, dispersing the mixture by applying physical force such as sonication, stirring, or the like, and then recovering and drying the resultant without severe process conditions or a complicated process.

Particularly, this conducting material composition may be a powdery composition in which at least two kinds of conductive carbon-based materials are uniformly dispersed, and the conductive carbon-based materials may be contained at a high content in the slurry composition for forming an electrode and the electrode in a uniformly dispersed state using this conducting material composition. Further, the conducting material composition may have significantly excellent redispersibility in various polar solvents due to the action of the dispersant. Therefore, various slurry compositions for forming an electrode may be prepared and provided by redispersing this conducting material composition in various polar solvents, and suitably used in forming electrodes of various batteries including a cathode and an anode of a lithium rechargeable battery.

Therefore, the conducting material composition may maximally exhibit an effect obtained by containing at least two kinds of conductive carbon-based materials together and significantly contribute to providing a battery such as a lithium rechargeable battery having more improved electrical and lifetime characteristics, or the like.

Meanwhile, the conducting material composition according to the exemplary embodiment of the present invention may contain at least two kinds of conductive carbon-based materials in a state in which these materials are more uniformly dispersed due to the specific dispersant. The reason may be due to characteristics of the specific dispersant to be described below.

Pitch discharged as residue in a purification process of fossil fuel such as petroleum, coal, or the like, which is a by-product used to manufacture asphalt, may be in a form of a viscous mixture containing a plurality kinds of poly aromatic hydrocarbons having a plurality of aromatic rings. However, as experimental results obtained by the present inventors, it was confirmed that in the case in which an oxidation process using an oxidant is performed on the pitch as described above, or the like, among the poly aromatic hydrocarbons contained in the pitch, at least some of the poly aromatic hydrocarbons having an excessively large molecular weight were decomposed and poly aromatic hydrocarbons having an excessively small molecular weight of 300 or less were separated through a purification process such as centrifugation, or the like, such that a mixture of poly aromatic hydrocarbons having relatively narrow molecular weight distribution was obtained. In addition, it was confirmed that at least one oxygen containing functional group was introduced in the aromatic ring of each of the poly aromatic hydrocarbon, such that a mixture containing a plurality kinds of poly aromatic hydrocarbon oxides was obtained.

In detail, at the time of analyzing the mixture of the poly aromatic hydrocarbon oxides obtained by the method as described above using MALDI-TOF MS, it was confirmed that the mixture contained poly aromatic hydrocarbon oxides having a molecular weight of about 300 to 1000 or about 300 to 700 at a content of about 60 wt. % or more, about 65 wt. % or more, or about 70 to 95 wt. %. Specific kinds, structures, distributions, and the like, of the poly aromatic hydrocarbon oxides contained in the mixture as described above may be changed depending on the kind or an origin of pitch, which becomes a raw material, the kind of oxidant, or the like. However, the mixture of the poly aromatic hydrocarbon oxides contained in the dispersant contains a plurality kinds of poly aromatic hydrocarbon oxides having a structure in which at least one oxygen-containing functional group is introduced in the poly aromatic hydrocarbons including 5 to 30 or 7 to 20 aromatic rings, respectively, and the poly aromatic hydrocarbon oxides in the mixture as described above has the above-mentioned molecular weight distribution, that is, a molecular weight distribution in which a content of oxides having a molecular weight of about 300 to 1000 or about 300 to 700 in the entire mixture is about 60 wt. % or more.

In this case, the kind of oxygen-containing functional group may be changed depending on the kind of oxidant, or the like, used in an oxidation process of pitch, or the like, but may be, for example, at least one kind selected from the group consisting of a hydroxyl group, an epoxy group, a carboxyl group, a nitro group, and a sulfonic acid. In addition, various poly aromatic hydrocarbon oxides having various kinds of functional groups selected from the above-mentioned functional groups may be contained and mixed in the mixture of the poly aromatic hydrocarbon oxides.

The poly aromatic hydrocarbon oxides satisfying the above-mentioned structural characteristics and molecular weight distribution and the mixture thereof may simultaneously have a hydrophobic $\pi$-domain in which aromatic rings cluster together and a hydrophilic domain by the oxygen-containing functional group bonded to the aromatic ring, or the like. Among them, the hydrophobic $\pi$-domain may have a $\pi$-$\pi$ interaction with a surface of carbon nano tube, or the like, in which carbon-carbon bonds are formed, and the hydrophilic domain may allow repulsive force between each of the single nano tubes to be exhibited. As a result, the dispersant containing the mixture of the poly aromatic hydrocarbon oxides may be present between powders or particles (including particles having an arbitrary shape such as a sheet or flake shape, or the like) forming the each of the conductive carbon-based materials to more uniformly disperse these conductive carbon-based materials. In more detail, the dispersant may be adsorbed to thereby be present in a surface of each of the particles of the conductive carbon-based materials by the above-mentioned $\pi$-$\pi$ interaction. Therefore, the conducting material composition according to the exemplary embodiment of the present invention, containing the specific dispersant as described above may contain at least two kinds of conductive carbon-based materials in a uniformly dispersed state while being easily prepared and provided.

Therefore, high contents of the conductive carbon-based materials may be contained in the slurry composition for forming an electrode and the electrode in a uniformly dispersed state by using the conducting material composition. Therefore, a three dimensional network structure between at least two kinds of conductive carbon-based materials may be excellently formed, such that an effect of improving electrical characteristics obtained by using two or more conductive carbon-based materials together may be maximized. As a result, even in the case of using a relative low content of the conducting material composition, an electrode having excellent characteristics may be provided, and it is possible to allow the electrode to contain a higher content of an active material. Further, since an electrode containing higher contents of the conductive carbon-based materials in the uniformly dispersed state may be easily provided, the conducting material composition may significantly contribute to providing an electrode having a more improved characteristics and a battery such as a lithium rechargeable battery having excellent capacity and lifetime characteristics, or the like.

In addition, since the dispersant contained in the conducting material composition according to the exemplary embodiment of the present invention may be prepared from a raw material such as cheap pitch, or the like, by a simplified oxidation process, and thus it may be easily manufactured with low manufacturing cost. Since the electrode and the battery having excellent characteristics may be provided by only using this dispersant, high capacitance and high efficiency of the battery may be more easily achieved.

Meanwhile, an existing conducting material composition containing fibrous carbon such as carbon nano tube, or the like, and a polymer dispersant having a pyrene or quinacridone skeleton has been known (Korean Patent Laid-Open Publication No. 2010-0095473). However, in the case of using this polymer dispersant alone, a functional group suitable for the polymer dispersant should be introduced and used depending on the kind of a medium (for example, a solvent contained in the conducting material composition, or the like) in which the conductive carbon-based material will be dispersed. In addition, it is difficult to provide the polymer dispersant as described above and the conducting material composition containing the same in a powder state, and particularly, it is difficult to uniformly disperse the carbon nano tube, or the like, at a high content in the powder state as described above. Further, in the case of the existing polymer dispersant, when at least two kinds of conductive carbon-based materials are contained in the conducting material composition together, it is difficult to simultaneously and uniformly disperse these conductive carbon-based materials at high contents.

However, since the dispersant contained in the conducting material composition according to the exemplary embodiment of the present invention has a mixture state of the poly aromatic hydrocarbon oxides having various molecular weight in a constant range, various oxygen-containing functional groups, and the like, the dispersant may uniformly disperse the plurality kinds of conductive carbon-based material in various solvents or media without introducing a separate functional group, and the conducting material composition containing higher contents of conductive carbon-based materials in the uniformly dispersed state may be more easily prepared and provided. In addition, since the dispersant contained in the composition according to the exemplary embodiment of the present invention may uniformly disperse high contents of conductive carbon-based materials even in a powder state, an electrode and a battery containing high contents of conductive carbon-based materials may be easily provided by using the dispersant.

Meanwhile, each of the components of the conducting material composition according to the exemplary embodiment of the present invention will be described as follows.

In the conducting material composition according to the exemplary embodiment of the present invention, as the conductive carbon-based material such as carbon nano tube, graphene, carbon black, or the like, a carbon-based material having an arbitrary shape, previously known to be usable for various compositions for an electrode, or the like, may be used. For example, as the carbon nano tube, a single wall carbon nano tube or a multi wall carbon nano tube may be used without particular limitation, and carbon nano tube having an aspect ratio (length/diameter) of about 100 to 2000 may be used.

In addition, as the graphene or carbon black, an arbitrary kind of graphene or carbon black, having an arbitrary shape, previously known to be usable in various compositions for an electrode may be all used without particular limitation. For example, as the graphene, graphene flake, which is exfoliated and prepared from graphite or a derivative of thereof, having a size of about 50 nm to 10 µm and a thickness of about 0.34 nm to 50 nm may be suitably used.

In addition, at the time of performing element analysis on the plurality kinds of poly aromatic hydrocarbon oxides contained in the dispersant contained in the conducting material composition together with the conductive carbon-based materials, an oxygen content contained in the entire dispersant may be about 12 to 50 wt. % or about 15 to 45 wt. % of the entire element contents. The oxygen content as described above reflects a degree of introduction of the oxygen-containing functional group in the poly aromatic hydrocarbon oxides by the oxidation process, and the above-mentioned hydrophilic domain may be suitably contained depending on satisfaction of the oxygen content as described above. As a result, the conductive carbon-based materials may be more suitably dispersed using the above-mentioned dispersant.

The oxygen content may be calculated by performing element analysis on the plurality kinds of poly aromatic hydrocarbon oxides contained in the above-mentioned mixture. That is, in the case of heating a mixture sample (for example, about 1 mg) on, for example, thin foil, to a high temperature of about 900° C., while the foil is instantly melted, the temperature may be increased to about 1500 to 1800° C., and gas is generated from the mixture sample by the high temperature heat. The gas is collected and element contents may be measured and analyzed. As a result of the element analysis as described above, a total element content of carbon, oxygen, hydrogen, and nitrogen contained in the plurality kinds of poly aromatic hydrocarbon oxides may be measured and analyzed, and an oxygen content with respect to the total element content may be measured.

In addition, the dispersant contained in the conducting material composition according to the above-mentioned exemplary embodiment of the present invention may be prepared by a method including oxidizing a mixture containing poly aromatic hydrocarbons having a molecular weight of 200 to 1500 in the presence of the oxidant. This preparation method will be described in detail as follows.

As described above, the pitch discharged as residue in the purification process of fossil fuel such as petroleum, coal, or the like, may be in a form of a viscous mixture containing a plurality kinds of poly aromatic hydrocarbons. Of course, the specific kind, structure, composition ratio, molecular weight distribution, or the like, of the poly aromatic hydrocarbon may be changed depending on a raw material or origin of the pitch, but the pitch may contain a plurality kinds of poly aromatic hydrocarbons having 5 to 50 aromatic rings, for example, benzene rings in the structure and contain poly aromatic hydrocarbon having a molecular weight of substantially 200 to 1500. For example, in the preparation method of a dispersant, a mixture (for example, pitch) containing poly aromatic hydrocarbons having a molecular weight of 200 to 1500 used as a starting material may contain the poly aromatic hydrocarbon having a molecular weight in the above-mentioned range at a content of about 80 wt. % or more or about 90 wt. % or more.

However, when the mixture containing the poly aromatic hydrocarbons such as pitch, or the like, is subjected to an oxidation process using an oxidant, among the poly aromatic hydrocarbons contained in the pitch, poly aromatic hydrocarbons having an excessively large molecular weight may be decomposed, and a mixture of poly aromatic hydrocarbons having relatively narrow molecular weight distribution may be obtained. For example, poly aromatic hydrocarbons having a molecular weight of about 1000 or more than about 700 may be decomposed into a poly aromatic hydrocarbons having a small molecular weight. In addition, at least one oxygen containing functional group is introduced in the aromatic ring of each of the poly aromatic hydrocarbons, such that the mixture containing a plurality kinds of poly aromatic hydrocarbon oxides, in other words, the above-mentioned dispersant may be significantly simply prepared.

In the preparation method of a dispersant as described above, the kind of oxidant is not particularly limited, but any oxidant may be used without limitation as long as it may generate an oxidation reaction of introducing the oxygen-containing functional group in the aromatic hydrocarbon. A specific example of the oxidant as described above may include nitric acid ($HNO_3$), sulfuric acid ($H_2SO_4$), hydrogen peroxide ($H_2O_2$), ammonium cerium (IV) sulfate (($NH_4)_4Ce(SO_4)_4$), or ammonium cerium (IV) nitrate (($NH_4)_2Ce(NO_3)_6$), and a mixture of at least two kinds thereof may also be used.

In addition, the oxidizing of the mixture may be performed in an aqueous solvent at a reaction temperature of about 10 to 110° C. for about 0.5 to 20 hours. In a specific example, after adding a predetermined amount of a mixture containing the poly aromatic hydrocarbons in the presence of a liquid phase oxidant such as sulfuric acid, nitric acid, and/or the like, the oxidizing of the mixture may be performed, at room temperature (for example, about 20° C.) or 80° C., for about 1 to 12 hours. A dispersant having desired characteristics may be prepared by adjusting the reaction temperature or time, or the like, in the oxidizing of the mixture to suitably adjust characteristics of the above-mentioned dispersant, for example, a degree of oxidation of the poly aromatic hydrocarbons, or the like.

In addition, as described above, the mixture containing the poly aromatic hydrocarbons having a molecular weight of 200 to 1500, which is the starting material of the above-mentioned preparation method, may be derived from pitch obtained from fossil fuel or products of fossil fuel, and the kinds, the structures, the molecular weight distribution, or the like, of the poly aromatic hydrocarbons may be changed depending on the kind of this raw material, or the like. Nevertheless, as the oxidation process is performed on the mixture containing the poly aromatic hydrocarbons having a molecular weight of 200 to 1500, derived from the pitch, or the like, the above-mentioned dispersant having excellent dispersibility with respect to the carbon-based materials may be simply prepared.

Meanwhile, the above-mentioned preparation method may further include, after the oxidizing of the mixture, purifying the resultant to obtain a mixture of plurality kinds of poly aromatic hydrocarbon oxides, and the purifying of the resultant may be performed to include centrifuging the resultant of the oxidizing of the mixture. The mixture of the poly aromatic hydrocarbon oxides satisfying the above-mentioned molecular weight distribution, that is, the above-mentioned dispersant may be suitably obtained with a higher purity by performing the purifying of the resultant, and carbon nano tube may be uniformly dispersed using the dispersant.

Meanwhile, the conducting material composition according to the exemplary embodiment of the present invention, containing the above-mentioned dispersant, or the like, may be in a powder state in which at least two kinds of conductive carbon-based material in a powder or particle state and the dispersant present in the surface of the conductive carbon-based material are contained. That is, the dispersant is present in a state in which the dispersant is adsorbed in the powder or particles of each of the conductive carbon-based materials by the π-π interaction, or the like, and may simultaneously and uniformly disperse the powdery or particulate conductive carbon-based materials, particularly at least two kinds of conductive carbon-based materials through the π-π interaction, repulsive force, and the like. Therefore, the slurry composition and the electrode may be obtained by mixing the powdery conducting material composition with other components of the slurry composition for forming an electrode to be described below. In addition, since the powdery conducting material composition has excellent redispersibility in various polar solvents, it is possible to prepare the slurry composition for forming an electrode and the electrode in which at least two kinds of conductive carbon-based materials are uniformly dispersed and contained at high contents while further improving processability.

Further, in the conducting material composition according to the exemplary embodiment of the present invention, the at least two kinds of conductive carbon-based materials may be suitably selected from carbon nano tube, graphene, and carbon black in consideration of electrical characteristics to be desired, the kind of battery or electrode to which the conducting material will be applied, or the like. In addition, a mixing ratio of the selected at least two kinds of conductive carbon-based materials may also be suitably controlled by those in the skilled in the art in consideration of electrical characteristics to be desired, the kind of battery or electrode to which the conducting material will be applied, or the like. For example, the conductive carbon-based material may contain about 10 to 90 wt. % of carbon black and about 10 to 90 wt. % of at least one kind selected from graphene and carbon nano tube.

In addition, the conducting material composition according to the exemplary embodiment of the present invention may contain about 1 to 50 parts by weight, about 5 to 30 parts by weight, about 10 to 20 parts by weight, or about 15 to 30 parts by weight of the dispersant based on 100 parts by weight of the at least two kinds of conductive carbon-based materials. At least two kinds of conductive carbon-based materials may be uniformly dispersed together in the above-mentioned content range of the dispersant.

The above-mentioned conducting material composition according to the exemplary embodiment of the present invention may be used to form electrodes of various batteries. For example, the conducting material composition may be contained in the slurry composition for forming an electrode of a lithium rechargeable battery to thereby be used to form an electrode such as an cathode or anode of the lithium rechargeable battery, or the like. Particularly, since the specific dispersant as described above is adsorbed in the surface of each of the particles of the conductive carbon-based material in the conducting material composition, the conducting material composition may have excellent redispersibility in various polar solvents or aqueous solvent, particularly, n-methyl-pyrrolidone (NMP), or the like, used to manufacture the cathode as well as an aqueous solvent used to manufacture the anode of the lithium rechargeable battery.

Therefore, the conducting material composition may be used to form electrodes of significantly various batteries, or the like, including the cathode and the anode of the lithium rechargeable battery.

Meanwhile, the conducting material composition according to the exemplary embodiment of the present invention may be prepared by a significantly simplified preparation method including: forming a dispersion solution in which at least two kinds of conductive carbon-based materials and a dispersant are dispersed in a polar solvent; and dispersing the conductive carbon-based materials by performing sonication on the dispersion solution or applying physical force to the dispersion solution. In addition, the preparation method may further include, after the dispersing of the conductive carbon-based materials, recovering and dying a conducting material composition in a powder state from the dispersion solution.

That is, the conducting material composition according to the exemplary embodiment of the present invention may be prepared by a significantly simplified preparation method of mixing the conductive carbon-based materials and the dispersant in the polar solvent to obtain the dispersion solution, uniformly dispersing the dispersion solution using a method such as sonication, or the like, and recovering and drying the conducting material composition in the powder state from the dispersion solution.

In this preparation method, since the conductive carbon-based materials and the dispersant are already sufficiently described, an additional description thereof will be omitted.

Further, as the polar solvent in the dispersion solution, an arbitrary aqueous solvent or polar organic solvent such as at least one kind selected from the group consisting of water, NMP, acetone, N,N-dimethylformamide (DMF), dimethyl sulfoxide (DMSO), ethanol, isopropyl alcohol, methanol, butanol, 2-ethoxy ethanol, 2-butoxy ethanol, 2-methoxy propanol, tetrahydrofuran (THF), ethylene glycol, pyridine, dimethylacetamide, N-vinylpyrrolidone, methylethylketone (butanone), alpha-terpinol, formic acid, ethylacetate, and acrylonitrile may be used. As described above, the conducting material composition according to the exemplary embodiment of the present invention may be prepared by the significantly simple process even in the case of using a non-toxic solvent such as ethanol, or the like, without applying a separate severe process condition or a complicated process.

In addition, the dispersion solution may contain about 1 to 10 parts by weight of the conductive carbon-based materials and about 0.1 to 5 parts by weight of the dispersant based on 100 parts by weight of the polar solvent. The conducting material composition according to the exemplary embodiment of the present invention may be suitably prepared by using the dispersion solution as described above.

In addition, the dispersing carried out after obtaining the dispersion solution may be carried out by performing sonication on the dispersion solution or an arbitrary method of applying physical force, such as a method of mixing the dispersion solution, or stirring the dispersion solution using hands, and even though the dispersing of the dispersion solution is performed by the above-mentioned method, the conducting material composition in which the at least two kinds of conductive carbon-based materials are uniformly dispersed may be obtained. In this case, sonication may also be performed by various methods such as bath-type sonication, tip-type sonication, or the like, and the method of applying physical force may be performed by various methods such as a method of mechanically mixing the dispersion solution, a method of applying labor force to stir or shake the dispersion solution, or the like.

However, the conducting material composition in which the conductive carbon-based materials are more uniformly dispersed may be obtained by combining and sequentially performing sonication such as bath-type sonication and the stirring.

Meanwhile, specific conditions for performing sonication or the method of applying physical force, or the like, may be clearly adjusted by those skilled in the art in consideration of an amount of the dispersion solution, the specific kind, amount, or concentration of the conductive carbon-based material or the dispersant.

In addition, the recovering of the conducting material composition after the dispersing may be performed by centrifugation, vacuum filtration, pressure filtration, or the like. Further, the drying may be performed by vacuum drying at a temperature of about 30 to 90° C.

According to another exemplary embodiment of the present invention, there is provided a slurry composition for forming an electrode of a lithium rechargeable battery containing the above-mentioned conducting material composition. This slurry composition may contain an electrode active material, the above-mentioned conducting material composition according to the exemplary embodiment of the present invention, a binder, and a solvent.

This slurry composition for forming an electrode may be prepared by mixing the above-mentioned powdery conducting material composition with other components such as the active material, the binder, the solvent, and the like. Particularly, as the slurry composition is obtained using the conducting material composition in which the conductive carbon-based materials themselves are uniformly dispersed, the slurry composition may contain the conducting material in which the conductive carbon-based materials are uniformly dispersed at a high concentration, and an electrode containing the conductive carbon-based materials at high contents in a uniformly dispersed state may be obtained.

However, a composition and preparation method of the slurry composition according to another exemplary embodiment of the present invention may be the same as those of a general slurry composition for forming an electrode of a lithium rechargeable battery except for using the conducting material composition according to the exemplary embodiment of the present invention.

For example, the slurry composition may contain an electrode active material such as a cathode active material or an anode active material, wherein as the cathode active material, a metal oxide capable of intercalating/deintercalating lithium, a lithium composite metal oxide, a lithium composite metal sulfide, a lithium composite metal nitride, or the like, may be used. In addition, as the anode active material, arbitrary lithium or lithium alloy, a carbon- or silicon-based material, or the like, previously known to be usable as the anode active material of the lithium rechargeable battery, for example, a lithium metal or lithium alloy; cokes, artificial graphite, natural graphite, an organic polymer compound combustible material, carbon fiber, Si, $SiO_x$, Sn, $SnO_2$, or the like, may be all used without particular limitation.

In addition, as the binder, a rein containing at least one kind selected from the group consisting of a vinylidenefluoride/hexafluoropropylene copolymer, polyvinylidenefluoride, polyacrylonitrile, polymethylmethacrylate, polyacrylate, polytetrafluoroethylene, a poly(styrene-butadiene) copolymer, alginate, and polydopamine, or a mixture thereof may be used.

In addition, as the solvent, one solvent selected from the group consisting of water, N-methylpyrrolidone, acetone, tetrahydrofuran, and decane, or a mixed solvent of at least two kinds thereof may be used.

Meanwhile, the above-mentioned slurry composition according to another exemplary embodiment of the present invention may contain about 70 to 98 parts by weight of the electrode active material, about 0.1 to 15 parts by weight of the conducting material composition, and about 0.1 to 20 parts by weight of the binder based on 100 parts by weight of a total solid content obtained by adding solid contents of the electrode active material, the conducting material composition, and the binder except for the solvent. As the slurry composition contains the above-mentioned conducting material composition, the slurry composition may contain the conducting material containing at least two kinds of conductive carbon-based materials at a high content (<about 15 parts by weight based on the total solid content), and the conductive carbon-based material may be maintained in a uniformly dispersed state in the slurry composition. Therefore, an electrode and a battery containing at least two kinds of conductive carbon-based materials at a high content in a uniformly dispersed state and having more excellent electrical characteristics may be manufactured using the slurry composition as described above.

Meanwhile, according to another exemplary embodiment of the present invention, there is provided a lithium rechargeable battery manufactured using the above-mentioned conducting material composition and slurry composition for forming an electrode. This lithium rechargeable battery may include an anode including a current collector and an anode active material layer containing an anode active material, a conducting material, and a binder and formed on the current collector; a cathode including a current collector and a cathode active material layer containing a cathode active material, a conducting material, and a binder and formed on the current collector; and an electrolyte, wherein at least one of the conducting materials contained in the anode active material layer and the cathode active material layer contains the above-mentioned conducting material composition according to the exemplary embodiment of the present invention.

In this lithium rechargeable battery, at least two kinds of conductive carbon-based materials may be contained in the electrode at a high content in a uniformly dispersed state. Therefore, a three dimensional network structure may be excellently formed between at least two kinds of conductive carbon-based materials, such that electric characteristics may be further improved, and a battery, such as a lithium rechargeable battery having improved electrical characteristics, capacity characteristics and lifetime characteristics, or the like, may be provided by maximizing advantages caused by using two or more conductive carbon-based materials together. As a result, the present invention may significantly contribute to implementing high capacity characteristics of various batteries such as the lithium rechargeable battery, or the like.

Meanwhile, since the lithium rechargeable battery may have the same configuration as that of a general lithium rechargeable battery except for using the conducting material composition according to the exemplary embodiment of the present invention as the conducting material, an additional description thereof will be omitted.

EXAMPLES

Hereinafter, actions and effects of the present invention will be described in detail with reference to specific Examples of the present invention. However, the Examples are only for illustrative purposes and are not intended to limit the scope of the present invention.

Preparation Example 1

Preparation of Dispersant

A dispersant of Preparation Example 1 was prepared by performing the following oxidation and purification process on pitch, which was a petroleum byproduct obtained from Posco.

First, 0.5 to 1.5 g of pitch was added to 75 ml of a sulfuric acid/nitric acid mixed solution (volume ratio 3:1) and an oxidation reaction was carried out at about 70° C. for about 3.5 hours.

Then, the pitch reaction solution subjected to the oxidation reaction was cooled to room temperature, diluted about 5-folds with distilled water, and centrifuged at about 3500 rpm for 30 minutes. Subsequently, after a supernatant was removed, and the same amount of distilled water was added thereto and redispersed, the solution was centrifuged again under the same conditions, thereby finally recovering and drying the precipitate. Therefore, the dispersant of Preparation Example 1 was prepared.

First, molecular weight distribution of the pitch used as a raw material during a manufacturing process of the dispersant was analyzed using MALDI-TOF mass spectrum, and the results were illustrated in FIGS. 1A and 1B (enlarged views at a molecular weight region of 400 to 500). In addition, molecular weight distribution of the dispersant of Preparation Example 1 was similarly analyzed, and the results were illustrated in FIGS. 2A and 2B (enlarged views at a molecular weight region of 400 to 500). This analysis was performed by putting, mixing, and drying the pitch or the dispersant into a matrix using a MALDI TOF mass spectrometer (Ultraflex II, Bruker).

Referring to FIGS. 1A and 1B (the enlarged views), it was confirmed that the pitch contained poly aromatic hydrocarbons having a molecular weight of 200 to 1500. Particularly, large peaks were detected by a molecular weight interval of 14 Da in the enlarged view of FIG. 1B, and this result confirmed that a plurality kinds of poly aromatic hydrocarbons having different number of aromatic rings (benzene rings) were linked to each other by aliphatic hydrocarbon. On the contrary, referring to FIGS. 2A and 2B, in the case of the dispersant of Preparation Example 1, large peaks present by intervals of 44 Da and 16 Da, respectively, were observed in poly aromatic hydrocarbons, which proved that the dispersant was present in a mixture of poly aromatic hydrocarbon oxides in which oxygen-containing functional groups such as —COOH, —OH, —SO$_3$H, or the like was introduced in these aromatic hydrocarbons. It was confirmed that oxides having a molecular weight of about 300 to 1000, or 300 to 700 were contained at a content of 65 wt. % or more.

In addition, the pitch used as the raw material and the dispersant of Preparation Example 1 were analyzed using 13 C CPMAS NMR (Varian 400 MHz Solid-State NMR), and the results were compared and illustrated at upper and lower ends of FIG. 3, respectively. Referring to FIG. 3, in the pitch, a peak derived from carbon of aromatic hydrocarbons and a peak derived from carbon of some aliphatic hydrocarbon were confirmed, but the presence of an oxygen-containing functional group was not confirmed. On the contrary, as an NMR analysis result for the dispersant of Preparation Example 1, a peak of an oxygen-containing functional group was confirmed. It was confirmed that the oxygen containing functional group was an epoxy group, a hydroxyl group, a carboxyl group, or the like.

In addition, the pitch used as the raw material and the dispersant of Preparation Example 1 were analyzed in a powder state, respectively, using FT-IR (Agilent 660-IR) and the results were compared and illustrated in FIG. 4. It was confirmed from FIG. 4 that the peak of the oxygen containing functional group was generated in the dispersant of Preparation Example 1.

Preparation Examples 2 to 4

Preparation of Dispersants

Dispersants of Preparation Examples 2 to 4 were prepared by the same method as in Preparation Example 1 except for using pitch (provided that, a different pitch sample from the pitch of Preparation Example 1), which was a petroleum byproduct obtained from Posco, and changing an oxidation reaction time to 1 hour (Preparation Example 2), 3.5 hours (Preparation Example 3), and 7 hours (Preparation Example 4), respectively.

These dispersant were analyzed by the same method as in Preparation Example 1 using MALDI-TOF mass spectrum, and the results were compared and illustrated in FIG. 5. Referring to FIG. 5, it was confirmed that as an oxidation time was increased, a content of components (poly aromatic hydrocarbon oxides) having a molecular weight more than about 1000 or 700 in the dispersant was decreased, such that a mixture type dispersant containing poly aromatic hydrocarbon oxides having a molecular weight of about 300 to 1000, or about 300 to 700 at a higher content was obtained.

Experimental Example 1

Measurement of Oxygen Content of Dispersant 1 mg of dispersant samples obtained Preparation Examples 3 and 4 were heated on thin foil at a high temperature of about 900° C. In this case, while the foil was instantly melted, the temperature was increased up to about 1500 to 1800° C., and gases were generated from the samples by the high temperature heat. These gases were collected and subjected to element analysis, thereby carbon, oxygen, hydrogen, and nitrogen contents were measured and analyzed. These analysis results were compared with analysis results of the pitch used to manufacture each of the dispersants and illustrated in the following Table 1.

TABLE 1

| Sample | C(wt. %) | H(wt. %) | N(wt. %) | O(wt. %) |
|---|---|---|---|---|
| pitch | 95.5 | 4.5 | — | — |
| Preparation Example 3 | 40.0 | 1.8 | 7.6 | 38.0 |
| Preparation Example 4 | 40.0 | 1.5 | 7.8 | 39.2 |

Referring to Table 1, it was confirmed that at the time of analyzing each of the element contents in the dispersants of Preparation Examples 3 and 4, the oxygen contents were about 12 to 50 wt. %, or about 30 to 40 wt. % of the entire element content.

Example 1

Preparation of Conducting Material Composition 5 g of a conductive carbon-based material obtained by mixing graphene flake and carbon black at a weight ratio of 8:2 and 2.5 g of the dispersant of Preparation Example 1 were put into 500 ml of THF and dispersed for 60 minutes by tip-type sonication. The resultant was centrifuged at 3500 rpm for 30 minutes and vacuum dried at 50° C., thereby preparing a powdery conducting material composition of Example 1.

An electron microscope photograph of the conducting material composition of Example 1 obtained as described above was illustrated in FIG. 6A. Referring to FIG. 6A, it was confirmed that the powdery conducting material composition in which the graphene flake and carbon black were contained in a uniformly dispersed state was formed.

Example 2

Preparation of Conducting Material Composition 5 g of a conductive carbon-based material obtained by mixing graphene flake and carbon black at a weight ratio of 8:2 and 2.5 g of the dispersant of Preparation Example 1 were put into 500 ml of THF and dispersed for 180 minutes by bath-type sonication. The resultant was centrifuged at 3500 rpm for 30 minutes and vacuum dried at 50° C., thereby preparing a powdery conducting material composition of Example 2.

An electron microscope photograph of the conducting material composition of Example 2 obtained as described above was illustrated in FIG. 6B. Referring to FIG. 6B, it was confirmed that the powdery conducting material composition in which the graphene flake and carbon black were contained in a uniformly dispersed state was formed.

Example 3

Preparation of Conducting Material Composition 5 g of a conductive carbon-based material obtained by mixing carbon nano tube and carbon black at a weight ratio of 5:5 and 2.5 g of the dispersant of Preparation Example 1 were put into 500 ml of ethanol and dispersed for 60 minutes by tip-type sonication. The resultant was centrifuged at 3500 rpm for 30 minutes and vacuum dried at 50° C., thereby preparing a powdery conducting material composition of Example 3.

An electron microscope photograph of the conducting material composition of Example 3 obtained as described above was illustrated in FIG. 6C. Referring to FIG. 6C, it was confirmed that the powdery conducting material composition in which the carbon nano tube and carbon black were contained in a uniformly dispersed state was formed.

Example 4

Preparation of Conducting Material Composition 5 g of a conductive carbon-based material obtained by mixing graphene flake, carbon nano tube, and carbon black at a weight ratio of 6:2:2 and 2.5 g of the dispersant of Preparation Example 1 were put into 500 ml of ethanol and dispersed for 60 minutes by tip-type sonication. The resultant was centrifuged at 3500 rpm for 30 minutes and vacuum dried at 50° C., thereby preparing a powdery conducting material composition of Example 4.

An electron microscope photograph of the conducting material composition of Example 4 obtained as described above was illustrated in FIG. 6D. Referring to FIG. 6D, it was confirmed that the powdery conducting material composition in which the graphene flake, carbon nano tube, and carbon black were contained in a uniformly dispersed state was formed.

Example 5

Preparation of Slurry Composition for Forming Anode and Anode

A conductive carbon-based material obtained by mixing 0.5 of carbon nano tube and 0.5 g of carbon black and 0.5 g of the dispersant of Preparation Example 1 were put into 150 ml of ethanol and dispersed for 60 minutes by tip-type sonication. The resultant was centrifuged at 3500 rpm for 30 minutes and vacuum dried at 50° C., thereby preparing a powdery conducting material composition.

After preparing a slurry composition for forming an anode by mixing this conducting material composition and an anode active material (graphite and carbon coated SiO) at a weight ratio of 1:80 in an aqueous solvent (water) using a mortar, the prepared slurry composition was applied on a copper current collector (copper tape) and dried.

An electron microscope photograph of the resultant obtained as described above was illustrated in FIG. 7A. Referring to FIG. 7A, it was confirmed that the powdery conducting material composition had excellent redispersibility for the aqueous solvent, such that even after preparing the slurry composition for forming an anode and the electrode, a state in which the carbon nano tube and carbon black were contained in the uniformly dispersed state was maintained.

Example 6

Preparation of Slurry Composition for Forming Cathode and Cathode

A conductive carbon-based material obtained by mixing 0.5 of carbon nano tube and 0.5 g of carbon black and 0.5 g of the dispersant of Preparation Example 1 were put into 150 ml of ethanol and dispersed for 60 minutes by tip-type sonication. The resultant was centrifuged at 3500 rpm for 30 minutes and vacuum dried at 50° C., thereby preparing a powdery conducting material composition.

After preparing a slurry composition for forming a cathode by mixing this conducting material composition, a cathode active material (Ni—Mn—Co-ternary blended oxide), and a binder (PVDF) at a weight ratio of 2:96:2 in NMP using a homodisperser, the prepared slurry composition was applied on a copper current collector (copper tape) and dried.

An electron microscope photograph of the resultant obtained as described above was illustrated in FIG. 7B. Referring to FIG. 7B, it was confirmed that the powdery conducting material composition had excellent redispersibility for NMP, such that even after preparing the slurry composition for forming a cathode and the electrode, a state in which the carbon nano tube and carbon black were contained in the uniformly dispersed state was maintained.

Experimental Example 2

Evaluation of Redispersibility of Powdery Conducting Material Composition for Polar Solvent 20 mg of the powdery conducting material composition obtained in Example 3 was added to 10 ml of various solvents illustrated in FIG. 8, and redispersed for 1 hour using a bath type sonicator. FIG. 8 is a photograph illustrating evaluation results of reproducibility, observed by the naked eyes.

Referring to FIG. 8, it was confirmed that the powdery conducting material composition in Example had excellent reproducibility for various polar solvents, such that even after preparing the slurry composition for forming an electrode and the electrode using the powdery conducting material composition, at least two kinds of conductive carbon-based materials may be contained in a uniformly dispersed state. Therefore, the powdery conducting material composition of Example may be suitably applied to form various battery electrodes including the cathode and the anode of the lithium rechargeable battery.

Experimental Example 3

Measurement of Sheet Resistance of Cathode Slurry Using Powdery Conducting Material Composition After slurry prepared so that a cathode material (LG03), the conducting material of Example 3, and a binder (KF1300) were contained at a weight ratio of 92:2:2 was coated on PET by bar coating, sheet resistance was measured using a four-probe method and the result was illustrated in FIG. 9. For reference, in FIG. 9, a measurement result represented by C was a measurement result in the case of using the conducting material of Example 3. In addition, a measurement result (represented by A) in the case of using the same content of carbon nano tube having a length of 1 μm (ACN, chopped CNT) and a measurement result (represented by B) in the case of using the same content of carbon nano tube having a length of 3 μm (ACN, chopped CNT), instead of the mixture of 1 μm (ACN, chopped CNT) and carbon black in the conducting material of Example 3, were compared and illustrated together.

Referring to FIG. 9, it was confirmed that in the case of using the conducting material of Example 3, sheet resistance was decreased, such that excellent dispersibility and electrical characteristics were exhibited as compared to the case of using only carbon nano tube.

Experimental Example 4

Physical Properties Test of Slurry Using Mixed Powdery Conducting Material (Using in Cathode)

A maximum particle size of particles in the slurry obtained in Experimental Example 3 was measured 5 times using a grinding gauge, and an average thereof was measured. The results were illustrated in the following Table 2. It was confirmed that in the case of the mixed powdery conducting material, a secondary particle size was decreased as compared to the slurry prepared using the conducting material containing only carbon nano tube having a length of 1 μm, and as a viscosity test result of the prepared slurry, even though a solid content was high, a viscosity was low, such the slurry had excellent flowability.

TABLE 2

| Kind of Conducting Material | Solid Content (wt. %) | Maximum particle Size (μm) | Mixing Time |
|---|---|---|---|
| CNT (1 μm) | 65.5 | 70 | 210 min |
| Mixed Conducting Material CNT(1 μm):CB = 1:1 | 69.7 | 25 | 90 min |

The invention claimed is:

1. A conducting material composition comprising:
   at least two kinds of conductive carbon-based materials selected from the group consisting of carbon nano tube, graphene, and carbon black; and
   a dispersant containing a plurality of poly-aromatic hydrocarbon oxides,
   wherein the dispersant contains poly-aromatic hydrocarbon oxides having a molecular weight of 300 to 700 at a content of 60 wt. % or more,
   wherein the dispersant is adsorbed in a surface of the conductive carbon-based material.

2. The conducting material composition of claim 1, wherein the conducting material composition is in a powder state.

3. The conducting material composition of claim 1, wherein the conductive carbon-based material contains 10 to 90 wt. % of carbon black, and 10 to 90 wt. % of at least one kind selected from graphene and carbon nano tube.

4. The conducting material composition of claim 1, wherein at the time of performing element analysis on the plurality kinds of poly aromatic hydrocarbon oxides, an oxygen content is 12 to 50 wt. % of the entire element content of the dispersant.

5. The conducting material composition of claim 1, wherein the poly aromatic hydrocarbon oxides have a structure in which at least one oxygen-containing functional group is bonded to aromatic hydrocarbon including 5 to 30 benzene rings.

6. The conducting material composition of claim 5, wherein the aromatic hydrocarbon has 7 to 20 benzene rings in a structure.

7. The conducting material composition of claim 5, wherein the oxygen-containing functional group of the dispersant includes at least one kind selected from the group consisting of a hydroxyl group, an epoxy group, a carboxyl group, a nitro group, and sulfonic acid.

8. The conducting material composition of claim 1, wherein it contains 1 to 50 parts by weight of the dispersant based on 100 parts by weight of the conductive carbon-based material.

9. A slurry composition for forming an electrode of a lithium rechargeable battery, the slurry composition comprising an electrode active material, the conducting material composition of claim 1, a binder, and a solvent.

10. The slurry composition of claim 9, wherein the electrode active material includes a cathode active material or an anode active material.

11. The slurry composition of claim 9, wherein the binder includes at least one kind selected from the group consisting of a vinylidenefluoride/hexafluoropropylene copolymer, polyvinylidenefluoride, polyacrylonitrile, polymethylmethacrylate, polyacrylate, polytetrafluoroethylene, a poly(styrene-butadiene) copolymer, alginate, and polydopamine.

12. The slurry composition of claim 9, wherein the solvent includes at least one kind selected from the group consisting of water, N-methylpyrrolidone, acetone, tetrahydrofuran, and decane.

13. The slurry composition of claim 9, wherein it contains:
   based on 100 parts by weight of a total solid content obtained by adding solid contents of the electrode active material, the conducting material composition, and the binder,
   70 to 98 parts by weight of the electrode active material;
   1 to 15 parts by weight of the conducting material composition; and
   1.0 to 20 parts by weight of the binder.

14. A lithium rechargeable battery comprising:
   an anode including a current collector and an anode active material layer containing an anode active material, a conducting material, and a binder and formed on the current collector;
   a cathode including a current collector and a cathode active material layer containing a cathode active material, a conducting material, and a binder and formed on the current collector; and
   an electrolyte,
   wherein at least one of the conducting materials contained in the anode active material layer and the cathode active material layer contains the conducting material composition of claim 1.

* * * * *